(12) United States Patent
Zeng et al.

(10) Patent No.: US 11,646,565 B2
(45) Date of Patent: May 9, 2023

(54) OVERCURRENT PROTECTION METHOD, OVERCURRENT PROTECTION CIRCUIT, AND DISPLAY DEVICE

(71) Applicant: HKC CORPORATION LIMITED, Shenzhen (CN)

(72) Inventors: Dekang Zeng, Chongqing (CN); Shuixiu Hu, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 313 days.

(21) Appl. No.: 17/041,424

(22) PCT Filed: Jan. 29, 2019

(86) PCT No.: PCT/CN2019/073637
§ 371 (c)(1),
(2) Date: Sep. 24, 2020

(87) PCT Pub. No.: WO2020/133634
PCT Pub. Date: Jul. 2, 2020

(65) Prior Publication Data
US 2021/0021118 A1    Jan. 21, 2021

(30) Foreign Application Priority Data
Dec. 27, 2018    (CN) .......................... 201811607036.0

(51) Int. Cl.
*H02H 3/00*    (2006.01)
*H02H 3/08*    (2006.01)
*H02H 7/00*    (2006.01)

(52) U.S. Cl.
CPC .............. *H02H 3/08* (2013.01); *H02H 7/008* (2013.01)

(58) Field of Classification Search
CPC ................................. H02H 3/08; H02H 7/008
(Continued)

(56) References Cited

U.S. PATENT DOCUMENTS

| 10,116,131 B2 * | 10/2018 | Zhang ...................... H02H 3/08 |
| 2014/0160110 A1 | 6/2014 | Bang et al. |
| 2019/0081471 A1 * | 3/2019 | Park ........................ H02H 3/08 |

FOREIGN PATENT DOCUMENTS

| CN | 106409241 A | 2/2017 |
| CN | 106786344 A | 5/2017 |

(Continued)

OTHER PUBLICATIONS

Chunchun Guo, the ISA written comments, dated Jul. 2019, CN.
Chunchun Guo, the International Search Report, dated Jul. 2019, CN.

*Primary Examiner* — Jared Fureman
*Assistant Examiner* — Lucy M Thomas

(57) ABSTRACT

This application discloses an overcurrent protection method, an overcurrent protection circuit, and a display device. The overcurrent protection method includes: setting an overcurrent protection value as an overcurrent protection threshold of a current clock signal branch; enabling the overcurrent protection threshold, and controlling to turn off a level shifting circuit; detecting a real-time current of a current clock signal branch in a first substrate row driving circuit; and comparing the real-time current with the overcurrent protection threshold, and when the real-time current is greater than or equal to the overcurrent protection threshold, cutting off a power supply of the current clock signal branch in the first substrate row driving circuit, and enabling overcurrent protection.

15 Claims, 4 Drawing Sheets

(58) Field of Classification Search
USPC .......................................................... 361/87
See application file for complete search history.

(56) References Cited

FOREIGN PATENT DOCUMENTS

| | | |
|---|---|---|
| CN | 108010497 A | 5/2018 |
| CN | 108062938 A | 5/2018 |
| CN | 108599096 A | 9/2018 |
| CN | 108923631 A | 11/2018 |

* cited by examiner

OVERCURRENT PROTECTION METHOD, OVERCURRENT PROTECTION CIRCUIT, AND DISPLAY DEVICE

CROSS REFERENCE OF RELATED APPLICATIONS

This application claims priority to Chinese Patent Application No. CN201811607036M, filed with National Intellectual Property Administration, PRC on Dec. 27, 2018 and entitled "OVERCURRENT PROTECTION METHOD, OVERCURRENT PROTECTION CIRCUIT, AND DISPLAY DEVICE", which is incorporated herein by reference in its entirety.

TECHNICAL FIELD

This application relates to the field of display technologies, and in particular, to an overcurrent protection method, an overcurrent protection circuit and a display device.

BACKGROUND

Statement herein merely provides background information related to this application, and does not necessarily constitute the prior art.

With the development and progress of science and technologies, liquid crystal displays have become mainstream products of displays because of advantages such as a thin body, power saving, and low radiation, and are widely used. Most of liquid crystal displays on the market are backlight liquid crystal displays, including a liquid crystal, panel and a backlight module. The operating principle of a liquid crystal panel is placing liquid crystal molecules between two parallel glass substrates, and applying a drive voltage to the two glass substrates to control rotation directions of the liquid crystal molecules, so as to refract the light of the backlight module to generate a picture. Currently, a thin film transistor liquid crystal display has gradually dominated the field of display because of performance such as low power consumption, excellent picture quality, and relatively high production yield. Similarly, the thin film transistor liquid crystal display includes a liquid crystal panel and a backlight module. The liquid crystal panel includes a color film substrate and a thin film transistor array substrate. A transparent electrode exists between opposite inner sides of the foregoing substrates. A layer of liquid crystal molecules is arranged between the two substrates.

To prevent damage caused by a short circuit of a circuit of a display panel, an overcurrent protection circuit may be disposed in the circuit of the display panel, so that when the short circuit occurs in the circuit of the display panel, the overcurrent protection circuit cuts off a power supply of the display panel to protect the display panel. However, for a display panel, because an individual difference exists in different display panels, load of branches inside the display panel is different. If an overcurrent protection threshold is set for all circuits in the display panel, overcurrent protection cannot be performed on in advance, some branches that are in the display panel and that have smaller overcurrent protection thresholds. When a short circuit occurs in the branches that have smaller overcurrent protection thresholds, heat is accumulated at locations of the short circuit, leading to a burnout of the display panel.

SUMMARY

This application provides an overcurrent protection method, an overcurrent protection circuit, and a display device, to perform overcurrent protection on circuits in a display panel in advance, thereby preventing a short circuit.

To achieve the foregoing objective, this application provides an overcurrent protection method, including steps of:

detecting a real-time current of a current clock signal branch in a first substrate row driving circuit;

outputting a corresponding overcurrent protection value to a level shifting circuit according to a real-time current;

setting the overcurrent protection value as an overcurrent protection threshold of a current clock signal branch;

enabling the overcurrent protection threshold, and controlling to turn off the level shifting circuit;

detecting the real-time current of the current clock signal branch in a first substrate row driving circuit; and comparing the real-time current with the overcurrent protection threshold, and when the real-time current is greater than or equal to the overcurrent protection threshold, cutting off a power supply of the current clock signal branch in the first substrate row driving circuit, and enabling overcurrent protection.

Optionally, the step of outputting, according to a real-time current, a corresponding overcurrent protection value to a level shifting circuit includes:

finding, according to a current slope waveform of the real-time current, the corresponding overcurrent protection value from an overcurrent protection value lookup table, and outputting the corresponding overcurrent protection value to the level shifting circuit.

Optionally, the overcurrent protection value lookup table is stored in a power supply-chip, the overcurrent protection value lookup table includes at least two groups of corresponding data of a current slope value of the current slope waveform and the overcurrent protection threshold.

Optionally, the overcurrent protection value in the overcurrent protection value lookup table corresponds to a peak of a real-time current slope waveform.

Optionally, the overcurrent protection value in the overcurrent protection value lookup table corresponds to a slope value of a real-time current slope waveform.

Optionally, the step of comparing the real-time current with the overcurrent protection threshold, and when the real-time current is greater than or equal to the overcurrent protection threshold, cutting off a power supply of the current clock signal branch in the first substrate row driving circuit, and enabling overcurrent protection includes:

comparing the current slope value of a real-time current slope waveform with the overcurrent protection threshold when the level shifting circuit is turned off, and cutting off the power supply of the current clock signal branch in the first substrate row driving circuit, and enabling circuit protection, when the current slope value of the real-time current is greater than or equal to the corresponding overcurrent protection threshold.

Optionally, the step of enabling the overcurrent protection threshold, and controlling to turn off the level shifting circuit includes:

determining whether an overcurrent protection threshold has been set for all clock signal branches in the first substrate row driving circuit, and if the overcurrent protection threshold has been set for all clock signal branches in the first substrate row driving circuit, controlling to turn off the level shifting circuit; and Optionally, if the overcurrent protection threshold is set completely for all the clock signal branches in the first substrate row driving circuit, continuing an operation of setting the overcurrent protection threshold; and if the overcurrent protection threshold has not been set for all clock signal branches in the first substrate row driving circuit, continuing an operation of setting the overcurrent protection threshold.

Optionally, after the step of redetecting the real-time current of the current clock signal branch in the first substrate row driving circuit when detecting that the level shifting circuit is restarted, the method further includes a step of:

outputting the corresponding overcurrent protection value to the level shifting circuit according to the detected real-time current.

Optionally, after the step of outputting the corresponding overcurrent protection value to the level shifting circuit according to the detected real-time current, the method further includes a step of:

setting the overcurrent protection value as the overcurrent protection threshold of the current clock signal branch by the level shifting circuit.

Optionally, after the step of setting the overcurrent protection value as the overcurrent protection threshold of the current clock signal branch by the level shifting circuit, the method further includes a step of:

controlling to turn off the level shifting circuit again.

Optionally, the step of controlling to turn off the level shifting circuit again includes:

determining whether the overcurrent protection threshold has been set for all the clock signal branches in the first substrate row driving circuit, and if the overcurrent protection threshold has been set for all the clock signal branches in the first substrate row driving circuit, controlling to turn off the level shifting circuit again.

Optionally, if it is determined that the overcurrent protection threshold has been set for all the clock signal branches in the first substrate row driving circuit, an operation of setting the overcurrent protection threshold is continued.

Optionally, in the step of enabling the overcurrent protection threshold, and controlling to turn off the level shifting circuit:

the level shifting circuit is turned off completely and no longer restarted.

This application further discloses an overcurrent protection circuit, including:
a detection circuit, configured to detect a real-time current slope waveform of a current clock signal branch in a first substrate row driving circuit;
an overcurrent protection determining circuit, configured to: compare and determine based on a current slope value of the real-time current slope waveform and an overcurrent protection value lookup table, and output a corresponding overcurrent protection value to a level shifting circuit; and
the level shifting circuit, configured to set the overcurrent protection value as an overcurrent protection threshold of the current clock signal branch, where the overcurrent protection determining circuit enables the overcurrent protection threshold, and controls to turn off the level shifting circuit.

When the level shifting circuit is turned off, the overcurrent protection determining circuit compares the current slope value of the real-time current slope waveform with the overcurrent protection threshold, and when the current slope value of the real-time current is greater than or equal to the corresponding overcurrent protection threshold, cuts off a power supply of the current clock signal branch in the first substrate row driving circuit, and enables circuit protection.

This application further discloses a display device, including a display panel. The display panel including an overcurrent protection circuit, and the overcurrent protection circuit includes:

a detection circuit, configured to detect a real-time current slope waveform of a current clock signal branch in a first substrate row driving circuit;

an overcurrent protection determining circuit, configured to: compare and determine based on a current slope value of the real-time current slope waveform and an overcurrent protection value lookup table, and output a corresponding overcurrent protection value to a level shifting circuit; and the level shifting circuit, configured to set the overcurrent protection value as an overcurrent protection threshold of the current clock signal branch, where the overcurrent protection determining circuit further enables the overcurrent protection threshold, and controls to turn off the level shifting circuit; and when the level shifting circuit is turned off, the overcurrent protection determining circuit compares the current slope value of the real-time current slope waveform with the overcurrent protection threshold, and when the current slope value of the real-time current is greater than or equal to the overcurrent protection threshold, cuts off a power supply of the current clock signal branch in the first substrate row driving circuit, and enables circuit protection.

Optionally, the display panel is one of a twisted nematic display panel, an in-plane switching display panel, and a multi-domain vertical alignment display panel.

According to this application, a real-time current of at least one clock signal branch in a first substrate row driving circuit may be detected according to a load difference between circuits of different display panels, and a corresponding overcurrent protection threshold may be set for the clock signal branch in the first substrate row driving circuit according to a status of an actual current, to perform overcurrent protection. In this way, because the real-time current is consistent with load corresponding to the display panel, display panels having different load correspond to different overcurrent protection thresholds, and therefore different overcurrent protection thresholds may be set according to statuses of actual currents for actual load of the different display panels, to prevent excessively large or excessively small overcurrent protection thresholds of the display panels having different load, that is, to prevent a case in which the excessively small overcurrent protection threshold causes the display panel to incorrectly trigger the overcurrent protection a plurality of times, and to prevent a case in which the excessively large overcurrent protection threshold causes a short circuit or a burnout of the display panel while overcurrent protection is still not enabled.

BRIEF DESCRIPTION OF DRAWINGS

The drawings included are used for providing understanding of embodiments of this application, constitute part of the specification, illustrate implementation manners of this application, and interpret principles of this application together with text description. Apparently, the accompanying drawings in the following descriptions are merely of some embodiments of this application, and a person of ordinary skill in the art can also obtain other accompanying drawings according to these accompanying drawings without involving any creative effort. In the accompanying drawings.

DETAILED DESCRIPTION OF EMBODIMENTS

Figure 1:
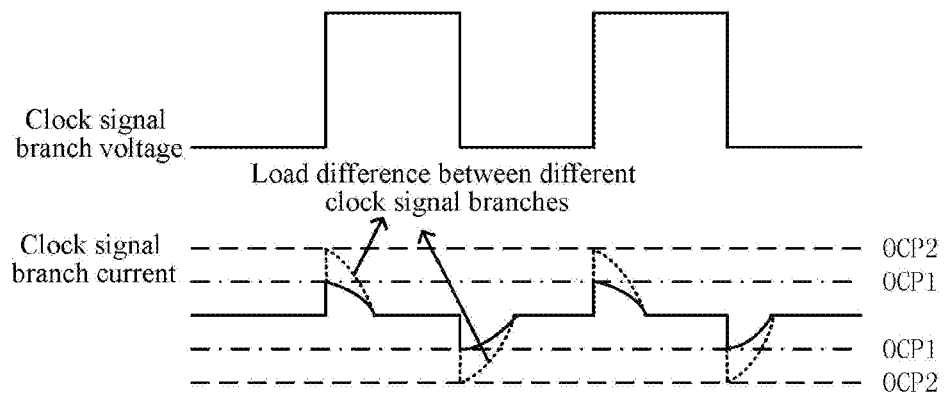
FIG. 1 is a schematic diagram of voltage and current variations of a clock signal branch according to an embodiment of this application.

Specific structures and functional details disclosed herein are merely representative, and are intended to describe the objectives of exemplary embodiments of this application. However, this application may be specifically implemented in many alternative forms, and should not be construed as, being, limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of the features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection, or an electrical connection; or the connection may be a direct connection, an indirect connection through an intermediary, or internal communication between two elements. A person of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an", and "the" are intended to include the plural forms as well, unless the context clearly indicates otherwise. It should be further understood that the terms "include" and/or "comprise" when used in this specification, specify the presence of stated features, integers, steps, operations, units, and/or components, but do not preclude the presence or addition of one or more other features, integers, steps, operations, units, components, and/or combinations thereof.

This application is described below with reference to the accompanying drawings and embodiments.

As shown in FIG. 1 to FIG. 5, embodiments of this application disclose an overcurrent protection method and an overcurrent protection circuit.

Figure 2:
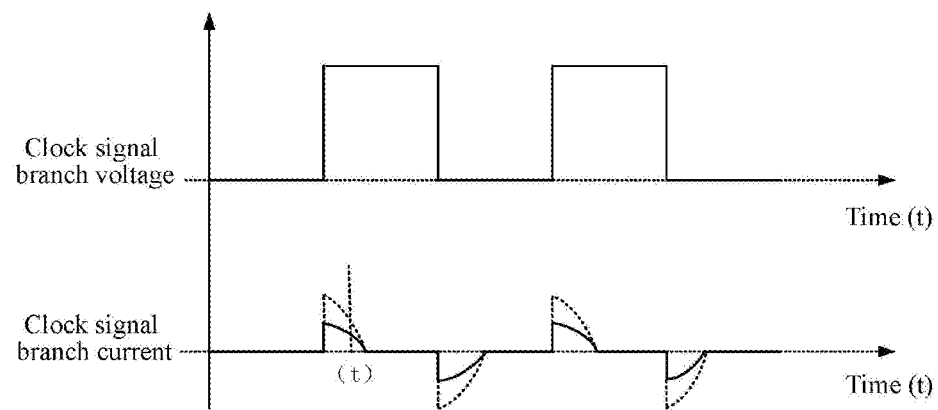
FIG. 2 is a schematic diagram of voltage and current variations of a clock signal branch according to an embodiment of this application.

FIG. 1 and FIG. 2 each are a schematic diagram of voltage and current variations of a clock signal branch. FIG. 1 shows influence of a load difference between different, clock signal branches on corresponding current and voltage variations. FIG. 2 shows current and voltage variation in a clock signal branch at a moment t.

Figure 3:
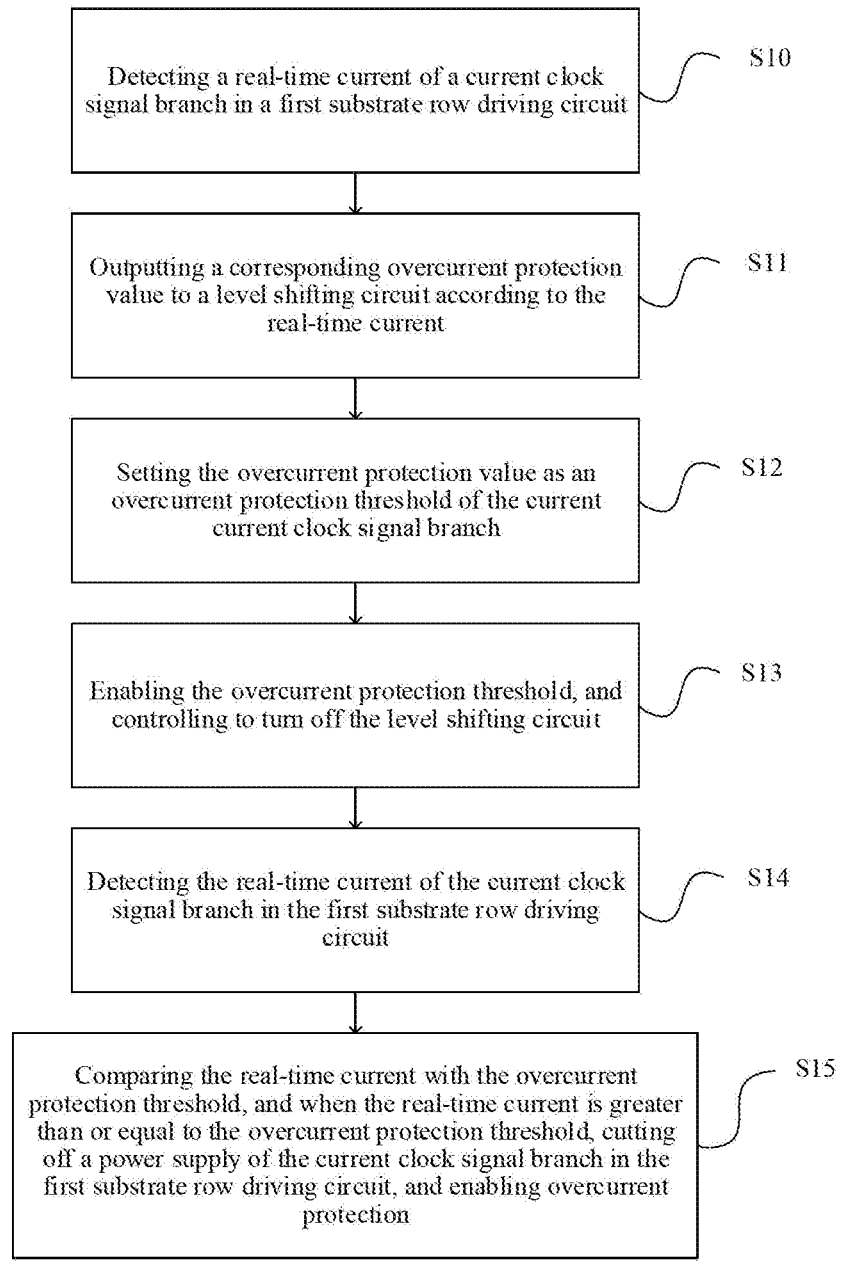
FIG. 3 is a schematic flowchart of an overcurrent protection method according to an embodiment of this application.

FIG. 3 is a block diagram of a process of an overcurrent protection method of this application. The overcurrent protection method includes steps of:

S10: detecting a real-time current of a current clock signal branch in a first substrate row driving circuit;

S11: outputting a corresponding overcurrent protection value to a level shifting circuit according to the real-time current;

S12: setting the overcurrent protection value as an overcurrent protection threshold of the current clock signal branch;

S13: enabling the overcurrent protection threshold, and controlling to turn off the level shifting circuit;

S14: detecting the real-time current of the current clock signal branch in the first substrate row driving circuit; and S15: comparing the real-time current with the overcurrent protection threshold, and when the real-time current is greater than or equal to the overcurrent protection threshold, cutting off a power supply of the current clock signal branch in the first substrate row driving circuit, and enabling overcurrent protection.

A general overcurrent protection method is setting a fixed overcurrent protection current value as a protection reference point for each display panel after calculating an appropriate overcurrent protection value. However, for a display panel, because an individual difference exists in different display panels, load of branches inside the display panel is different. If an overcurrent protection threshold is set for all circuits in the display panel, overcurrent protection cannot be performed on in advance, some branches that are in the display panel and that have smaller overcurrent protection thresholds. When a short circuit occurs in the branches that have smaller overcurrent protection thresholds, heat is accumulated at locations of the short circuit, leading to a burnout of the display panel.

According to this application, a real-time current of at least one clock signal branch in a first substrate row driving circuit may be detected according to a load difference between circuits of different display panels, and a corresponding overcurrent protection threshold may be set for the clock signal branch in the first substrate row driving circuit according to a status of an actual current, to perform overcurrent protection. In this way, because the real-time current is consistent with load corresponding to the display panel, display panels having different load correspond to different overcurrent protection thresholds, and therefore different overcurrent protection thresholds may be set according to statuses of actual currents for actual load of the different display panels, to prevent excessively large or excessively small overcurrent protection thresholds of the display panels having different load, that is, to prevent a case in which the excessively small overcurrent protection threshold causes the display panel to incorrectly trigger the overcurrent protection a plurality of times, and to prevent a case in which the excessively large overcurrent protection threshold causes a short circuit or a burnout of the display panel while overcurrent protection is still not enabled.

The first substrate is generally an array substrate. Other substrates suitable for this application may be used as well.

In one and more embodiments, the step of outputting a corresponding overcurrent protection value to a level shifting circuit according to the real-time current includes:

finding the corresponding overcurrent protection value from an overcurrent protection value lookup table 30, and outputting the corresponding overcurrent protection value to the level shifting circuit according to a current slope waveform of the real-time current.

The overcurrent protection value lookup table 30 is stored in a power supply circuit, the overcurrent protection value lookup table 30 includes at least two groups of corresponding data of a current slope value of the current slope waveform and the overcurrent protection threshold. The power supply chip 51 is configured to supply power to an overcurrent protection circuit and a current clock signal branch. The overcurrent protection value lookup table 30 may be obtained based on experimental data statistics, or may be corresponding data that is obtained by formula computing and designed to represent a plurality of types of current slope waveforms and overcurrent protection thresholds that are obtained during normal operation. In this way, when the overcurrent protection threshold is set for the first substrate row driving circuit, an overcurrent protection value that is more suitable for the first substrate row driving circuit may be set, so that the first substrate row driving circuit is well protected, and an excessively large deviation between the overcurrent protection threshold and an actual status of the circuit is prevented, thereby ensuring display quality of the display panel within the threshold, and preventing a case in which a current value is greater than an actual overcurrent value while circuit protection has not been performed.

In addition, Table 1 shows the overcurrent protection value lookup table 30 of this application.

TABLE 1

Table of correspondences between current slopes and overcurrent protection values

| Is1 | Is2 | ... | Is N |
|-----|-----|-----|------|
| OCP1 | OCP2 | ... | OCP N |

Is1 represents a first current slope value, and OCP1 represents a first overcurrent protection value;

Is2 represents a second current slope value, and OCP2 represents a second overcurrent protection value; and IsN represents an $N^{th}$ current slope value, and OCPN represents a $N^{th}$ overcurrent protection value, N being a natural number greater than or equal to 1.

In one and more embodiments, the overcurrent protection value in the overcurrent protection value lookup table 30 corresponds to a peak of a real-time current slope waveform. The first substrate row driving circuit during normal operation has current fluctuation. A peak of a real-time current slope waveform can mostly reflect a current fluctuation changing status of the first substrate row driving circuit during normal operation. Based on the peak of the real-time current slope waveform as a reference for presetting an overcurrent protection threshold, it can be ensured that the overcurrent protection threshold is greater than the peak but is not excessively large. In this way, a case in which a non-corresponding overcurrent protection threshold is caused by a relatively small or relatively large peak of the circuit due to specific reasons is prevented, and it is ensured that correct overcurrent protection can be performed on the first substrate row driving circuit.

In one and more embodiments, the overcurrent protection value in the overcurrent protection value lookup table 30 corresponds to a slope value of a real-time current slope waveform.

In this solution, the current slope value of the real-time current slope waveform actually includes data such as a peak, current duration, a current changing status or the like. The overcurrent protection threshold obtained from the corresponding current slope value of the real-time current slope waveform refers to most comprehensive data, to ensure that the overcurrent protection threshold is applicable in most cases so that display stability of the display panel is ensured.

In one and more embodiments, the step of enabling the overcurrent protection threshold, and controlling to turn off the level shifting circuit includes:

determining whether an overcurrent protection threshold has been set for all clock signal branches in the first substrate row driving circuit, and if the overcurrent protection threshold has been set for all the clock signal branches in the first substrate row driving circuit, controlling to turn off the level shifting circuit;

and if the overcurrent protection threshold has not been set for all the clock signal branches in the first substrate row driving circuit, continuing an operation of setting the overcurrent protection threshold.

After one clock signal branch may be selected for testing, or a plurality of clock signal branches may be selected for testing and an average value may be obtained for the first substrate row driving circuit, a corresponding overcurrent protection threshold may be set for all the clock signal branches. Certainly, for the first substrate row driving circuit, all clock signal branches may be traversed, and an overcurrent protection threshold may be separately for each clock signal branch, to cope with a load difference between different branches caused by a manufacturing process. For example, a length difference between clock signal branches in the first substrate row driving circuit obtained by production causes different resistance, leading to a case such as a load difference, and for a branch in the first substrate row driving circuit, an abrupt change in a current or a voltage is correctly determined, leading to setting of an incorrect overcurrent protection threshold. In addition, after the overcurrent protection threshold is set, the level shifting circuit is turned off, to prevent a case in which the display effect of the display panel is affected and the panel is even damaged because an excess short circuit current is set when a short circuit current is detected in the clock signal branch and the display panel copes with the short circuit current for a long time.

In one and more embodiments, the step of controlling to turn off the level shifting circuit again includes:

determining, whether the overcurrent protection threshold has been set for all the clock signal branches in the first substrate row driving circuit, and if the overcurrent protection threshold has been set for all the clock signal branches in the first substrate row driving circuit controlling to turn off the level shifting circuit again; and if the overcurrent protection threshold has not been set for all the clock signal branches in the first substrate row driving circuit, continuing the operation of setting the overcurrent protection threshold.

After the display panel is used for a long time, all row driving circuits may be damaged due to long-term use or a case in which row driving circuit load caused by replacement or repair is different from initial load. The level shifting circuit may be turned on again and redetection is performed to reset a new overcurrent protection threshold. The overcurrent protection threshold may change as a current or a voltage of the row driving circuit changes, and may be different from an overcurrent protection threshold that is set at original delivery. Because the overcurrent protection threshold is updated in time according to an actual situation of the circuit, based on the overcurrent protection threshold, a dynamic and continuous overcurrent protection can be performed for the first substrate row driving circuit.

In one and more embodiments, in the step of enabling the overcurrent protection threshold, and controlling to turn off the level shifting circuit:

the level shifting circuit is turned off completely and no longer restarted.

The level shifting circuit is turned off completely and no longer restarted, to ensure that the level shifting circuit cannot be started by mistake, thereby preventing, a case in which an excessively large overcurrent protection threshold is set because an overcurrent is detected, so that correct overcurrent protection can be performed on the first substrate row driving circuit, normal operation of the display panel is ensured, and damage and a burnout of the display panel are prevented.

Figure 4:
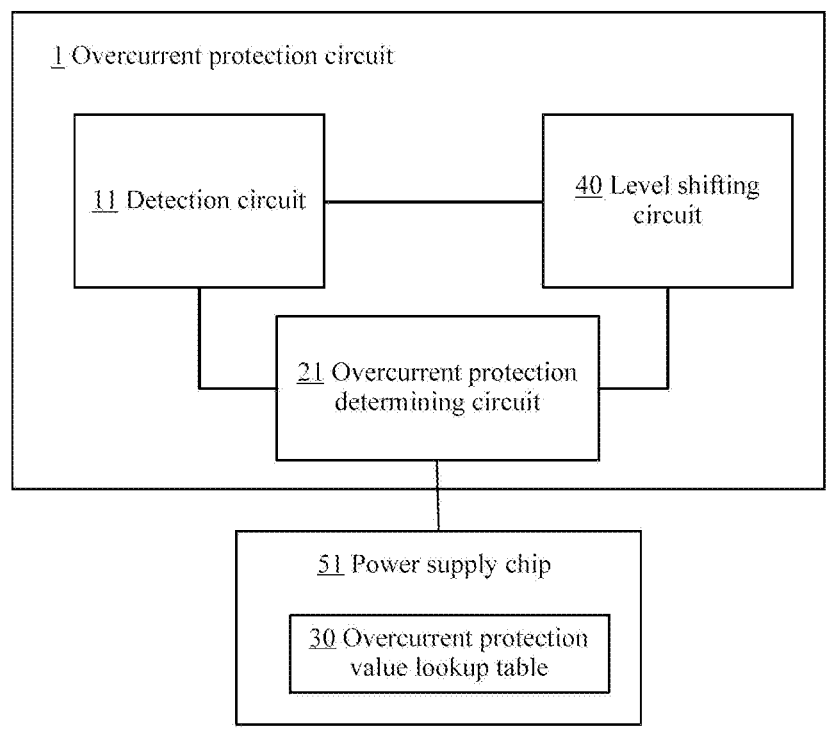
FIG. 4 is a schematic diagram of an overcurrent protection circuit according to an embodiment of this application.

FIG. 4 is a schematic diagram of an overcurrent protection circuit according to this application. In one and more embodiments, an overcurrent protection circuit 1 includes: a detection circuit 11, configured to detect a real-time current slope waveform of a current clock signal branch in a first substrate row driving circuit; an overcurrent protection determining circuit 21, configured to: compare and determine based on a current slope value of the real-time current slope waveform and an overcurrent protection value lookup table 30, and output a corresponding overcurrent protection value to a level shifting circuit; and the level shifting circuit 40, configured to set the overcurrent protection value as an overcurrent protection threshold of the current clock signal branch, where the overcurrent protection determining circuit further enables the overcurrent protection threshold, and controls to turn off the level shifting circuit, and when the level shifting circuit 40 is turned off, the overcurrent protection determining circuit 21 compares the current slope value of the real-time current slope waveform with the overcurrent protection threshold, and when the current slope value of the real-time current is greater than or equal to the overcurrent protection threshold, cuts off a power supply of the current clock signal branch in the first substrate row driving circuit, and enables circuit protection. The overcurrent protection value lookup table 30 is stored in a power supply chip 51, and the power supply chip 51 is configured to supply power to the overcurrent protection circuit 1, the power supply chip 51 may be a part of the overcurrent protection circuit 1.

In this solution, a corresponding overcurrent protection threshold is set for a current clock signal branch by detecting a real-time current slope waveform of the current clock signal branch in a first substrate row driving circuit, and when a real-time current threshold of a row driving circuit is greater than the overcurrent protection threshold, a power supply of the current clock signal branch in the first substrate row driving circuit is cut off, and circuit protection is enabled. In this way, by performing different overcurrent protection settings for different clock signal branches, a case in which a clock signal branch having a small overcurrent protection threshold is burnt before overcurrent protection is performed because a plurality of clock signal branches uses a fixed overcurrent protection threshold is prevented. In addition, the overcurrent protection lookup table 30 may be referred to Table 1.

Figure 5:
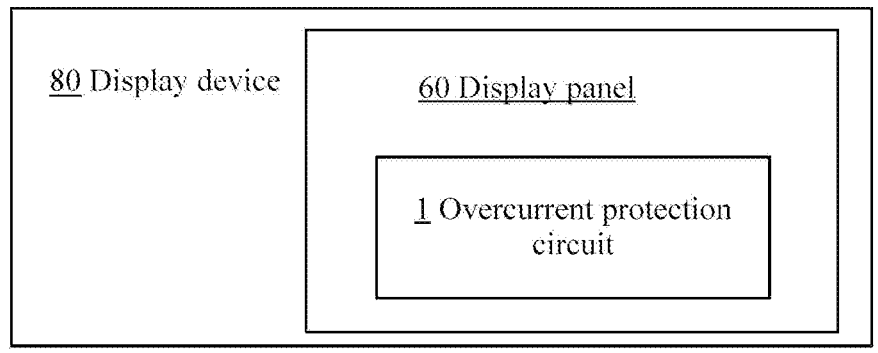
FIG. 5 is a schematic diagram of a display device according to an embodiment of this application.

FIG. 5 is a schematic diagram of a display device according to this application. In one and more embodiments, a display device 80 is disclosed. The display device includes a display panel 60. The display panel 60 includes the foregoing overcurrent protection circuit 1.

In this solution, the display device may set a corresponding overcurrent protection threshold according to a load status of a driving circuit of the display panel 60. In this way, different overcurrent protection thresholds may be set for different panels, to prevent a case in which a panel having a small overcurrent protection threshold is burnt before overcurrent protection is performed because different display panels 60 use a same overcurrent protection threshold.

It should be noted that the restrictions of steps related to this solution are not considered as limiting the sequential order of the steps on the premise that the implementation of the specific solution is not affected. A step that is written previously may be performed earlier, or may be performed later, and it may even be performed simultaneously. As long as this solution can be implemented, it all shall be considered to fall within the protection scope of this application.

The technical solution of this application may be widely applied to a Twisted Nematic Panel, an In-plane Switching Panel, or a Multi-Domain Vertical Alignment Panel, and may certainly be applied to any other suitable type of panel.

The foregoing content describes this application in detail with reference to the specific implementations, and it should not be considered that the specific implementations of this application are limited to these descriptions. A person of ordinary skill in the related art can further make simple deductions or replacements without departing from the concept of this application, and such deductions or replacements, should all be considered as falling within the protection scope of this application.

What is claimed is:

1. An overcurrent protection method, comprising steps of:
    detecting a real-time current of a current clock signal branch in a first substrate row driving circuit;
    outputting a corresponding overcurrent protection value to a level shifting circuit according to the real-time current;
    setting the overcurrent protection value as an overcurrent protection threshold of the current clock signal branch;
    enabling the overcurrent protection threshold, and controlling to turn off the level shifting circuit;
    detecting the real-time current of the current clock signal branch in the first substrate row driving circuit; and
    comparing the real-time current with the overcurrent protection threshold, and when the real-time current is greater than or equal to the overcurrent protection threshold, cutting off a power supply of the current clock signal branch in a first substrate row driving circuit, and enabling overcurrent protection.

2. The overcurrent protection method according to claim 1, wherein the step of outputting a corresponding overcurrent protection value to a level shifting circuit according to the real-time current comprises:
    finding the corresponding overcurrent protection value from an overcurrent protection value lookup table according to a current slope waveform of the real-time current, and outputting the corresponding overcurrent protection value to the level shifting circuit.

3. The overcurrent protection method according to claim 2, wherein the overcurrent protection value lookup table is stored in a power supply chip, the overcurrent protection value lookup table comprises at least two groups of corresponding data of a current slope value of the current slope waveform and the overcurrent protection threshold.

4. The overcurrent protection method according to claim 3, wherein the overcurrent protection value in the overcurrent protection value lookup table corresponds to a peak of a real-time current slope waveform.

5. The overcurrent protection method according to claim 2, wherein the overcurrent protection value in the overcurrent protection value lookup table corresponds to a slope value of a real-time current slope waveform.

6. The overcurrent protection method according to claim 1, wherein the step of comparing the real-time current with the overcurrent protection threshold, and when the real-time current is greater than or equal to the overcurrent protection threshold, cutting off a power supply of the current clock signal branch in the first substrate row driving circuit, and enabling overcurrent protection comprises:

comparing the current slope value of a real-time current slope waveform with the overcurrent protection threshold when the level shifting circuit is turned off, and when the current slope value of the real-time current is greater than or equal to the corresponding overcurrent protection threshold, cutting off the power supply of the current clock signal branch in the first substrate row driving circuit, and enabling circuit protection.

7. The overcurrent protection method according to claim 1, wherein the step of enabling the overcurrent protection threshold, and controlling to turn off the level shifting circuit comprises:

determining whether an overcurrent protection threshold has been set for all clock signal branches in the first substrate row driving circuit, and if the overcurrent protection threshold has been set for all the clock signal branches in the first substrate row driving circuit, controlling to turn off the level shifting circuit.

8. The overcurrent protection method according to claim 7, wherein the step of enabling the overcurrent protection threshold, and controlling to turn off the level shifting circuit comprises:

determining whether the overcurrent protection threshold has been set for all clock signal branches in the first substrate row driving circuit, and if the overcurrent protection threshold has not been set for all the clock signal branches in the first substrate row driving circuit, continuing an operation of setting the overcurrent protection threshold.

9. The overcurrent protection method according to claim 8, wherein after the step of enabling the overcurrent protection threshold, and controlling to turn off the level shifting circuit, the method further comprises a step of:

redetecting the real-time current of the current clock signal branch in the first substrate row driving circuit when detecting that the level shifting circuit is restarted.

10. The overcurrent protection method according to claim 9, wherein after the step of redetecting the real-time current of the current clock signal branch in the first substrate row driving circuit when detecting that the level shifting circuit is restarted, the method further comprises a step of:

outputting the corresponding overcurrent protection value to the level shifting circuit according to the detected real-time current.

11. The overcurrent protection method according to claim 10, wherein after the step of outputting the corresponding overcurrent protection value to the level shifting circuit according to the detected real-time current, the method further comprises a step of:

setting the overcurrent protection value as the overcurrent protection threshold of the current clock signal branch by the level shifting circuit.

12. The overcurrent protection method according to claim 11, wherein after the step of setting, by the level shifting circuit, the overcurrent protection value as the overcurrent protection threshold of the current clock signal branch, the method further comprises a step of:

controlling to turn off the level shifting circuit again.

13. The overcurrent protection method according to claim 12, wherein the step of controlling to turn off the level shifting circuit again comprises:

determining whether the overcurrent protection threshold has been set for all the clock signal branches in the first substrate row driving circuit, and if the overcurrent protection threshold has been set for all the clock signal branches in the first substrate row driving circuit, controlling to turn off the level shifting circuit again.

14. The overcurrent protection method according to claim 12, wherein the step of controlling to turn off the level shifting circuit again comprises:

determining whether the overcurrent protection threshold has been set for all clock signal branches in the first substrate row driving circuit, and if the overcurrent protection threshold has not been set for all the clock signal branches in the first substrate row driving circuit, continuing an operation of setting the overcurrent protection threshold.

15. The overcurrent protection method according to claim 1, wherein in the step of enabling the overcurrent protection threshold, and controlling to turn off the level shifting circuit, the level shifting circuit is turned off completely and no longer restarted.

* * * * *